United States Patent Office 3,542,571
Patented Nov. 24, 1970

3,542,571
PROCESS FOR PREPARING FERRIC TITANATE
William E. Smith, Sylvania, Ohio, assignor to Owens-Illinois, Inc., a corporation of Ohio
No Drawing. Continuation-in-part of application Ser. No. 517,839, Dec. 30, 1965. This application Nov. 12, 1968, Ser. No. 775,199
Int. Cl. C04b 35/00, 35/46
U.S. Cl. 106—39          10 Claims

ABSTRACT OF THE DISCLOSURE

There is disclosed a molten state process for preparing iron titanate crystal containing compositions of superior electrical properties and which are highly suitable and ideal for use in electrical devices at elevated temperatures. The process comprises homogeneously melting a composition containing $TiO_2$ and iron in the ferric valence state, rapidly quenching the homogeneous melt, and then heat treating in the presence of oxygen to form ferric titanate crystals. In a specific embodiment, the composition containing $TiO_2$ and ferric iron is prepared by oxidation of a ferrous containing material, e.g., a natural mineral such as ilmenite. The resulting product contains at least 9 percent by weight ferric titanate crystals.

RELATED APPLICATIONS

This application is a continuation-in-part of copending U.S. patent application Ser. No. 517,839, filed Dec. 30, 1965.

THE INVENTION

This invention relates to a novel process for preparing iron titanate. More particularly, this invention relates to a molten state process for preparing ferric titanate compositions of improved properties.

In the prior art, processes have been disclosed for preparing ferric titanate ($Fe_2TiO_5$) synthetically by solid state reactions between $Fe_2O_3$ and $TiO_2$. However, such processes have produced at best only partial conversion and have also resulted in ferric titanate compositions and products of relatively low homogeneity and poor uniformity. Likewise, the product(s) of such processes have not typically been reproducible. Since ferric titanate is an active material suitable for various electrical devices, it has become important to discover satisfactory processes for producing this material.

In accordance with this invention, there is provided a novel process for reproducibly preparing ferric titanate ($Fe_2TiO_5$) of consistent properties which overcomes the disadvantages and drawbacks associated with the prior art solid state processes and which can be readily used for a wide variety of electrical purposes including the preparation of various electrical devices, especially at elevated temperatures.

More particularly, there is provided a molten state process for preparing homogeneous, uniform ferric titanate crystal containing compositions of superior electrical properties and which are highly suitable and ideal for use in electrical devices at elevated temperatures, which process comprises forming a homogeneous melt of a composition containing titanium dioxide and iron in the ferric valence state by heating the composition to an elevated temperature at a rapid rate sufficient to prevent substantial formation of lower valence states of iron and titanium, rapidly quenching the homogeneous melt, and then controllably heat treating the quenched melt in the presence of oxygen so as to form ferric titanate crystals, the amount of titanium dioxide and ferric iron in the homogeneous melt composition being sufficient to stoichiometrically provide at least 9 percent by weight ferric titanate crystals in the heat treated, quenched melt.

In accordance with a specific embodiment of this invention, the composition containing titanium dioxide and ferric iron is prepared by oxidizing a compound, such as a natural mineral, which contains iron in a lower oxidation state (ferrous) and titanium in various forms, such as the oxide form. The resulting ferric containing composition is then subjected to the aforementioned homogeneous melt process, e.g., the steps of melting, quenching, and heat treating.

In carrying out the specific embodiment of this invention, various natural minerals can be used, the preferred mineral being ilmenite which is a natural mineral compound predominantly containing ferrous titanate

($FeOTiO_2$)

According to this preferred practice, the ferrous iron in ilmenite is oxidized to the ferric form of iron by roasting in an oxidizing atmosphere. The resulting product is determined to be predominantly ferric titanate

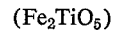
($Fe_2TiO_5$)

with excess $TiO_2$ formed as the by-product.

In accordance with the more particular aspects of this embodiment, the natural mineral compounds such as ilmenite are prepared in finely divided form. The size of the particles of the ground mineral is not particularly critical and can range over a considerable size. However, it has been found that a fine granular size of about $-100$ mesh is particularly suitable when using ilmenite, with a range of about $-400$ to about $-40$ mesh.

Roasting conditions can vary; generally the finely divided granular material is roasted in air at elevated temperatures for a sufficient period of time to convert the ferrous iron to the ferric iron state. Illustrative of the temperature at which the roasting reaction is carried out is 2400° F. for a period of about 16 to about 24 hours in an air atmosphere.

The ferric iron and $TiO_2$ containing composition is rapidly melted so as to prevent substantial formation of ferrous iron. When the composition has been subjected to a preliminary roasting step, e.g., as with ilmenite, the rapid melting is accomplished by heating the hot roasted material to a slightly elevated, glass melt forming temperature. Typically, the melting is at a temperature of about 2800° F. or higher.

The homogeneous melt is then rapidly quenched so as to form a glass and then heat treated under controlled conditions so as to form ferric titanate crystals. It is preferred that the recrystallization take place in a furnace capable of being maintained within about ±5° F. of the desired crystallization temperature.

In the specific embodiment hereof, the roasting operation is carried out for a sufficient amount of time to oxidize most of the FeO to $Fe_2O_3$. The starting material, when ilmenite is used, generally has the following approximate formula:

$$54FeO \cdot 4Fe_2O_3 \cdot 69TiO_2$$

This formula takes into account some rutile $TiO_2$ which is present mixed in with the ilmenite. It is believed, based on present knowledge, that the reaction takes place according to the formula:

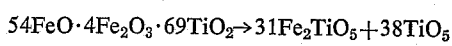
$$54FeO \cdot 4Fe_2O_3 \cdot 69TiO_2 \rightarrow 31Fe_2TiO_5 + 38TiO_5$$

The resulting product has been analyzed by X-ray diffraction apparatus and it is indicated that $Fe_2TiO_5$ and the rutile form of $TiO_2$ are the only crystalline phases present. Measurements of electrical properties show that the ferric titanate is present in extremely pure form as evidenced by a straight line in relationship of the resistance versus the inverse temperature curve. Activation energy has been calculated at 0.288 ev. and the equation for the curve was Rho=Ae−0.288/kt.

The high initial resistivity at room temperature which is observed to be $5 \times 10^4$ ohm-cm. coupled with its negative coefficient which lowers the resistivity to 113 ohm-cm. at 350° C. makes the material suitable for various electrical devices such as high temperature encapsulated thermistors capable of handling moderately high power through electronic conduction. By way of illustration, reference is made to U.S. Letters Patent 3,393,448 which discloses thermistors made from ferric titanate prepared in accordance with the process of this invention.

As a result of the process of this invention, it has been found that virtually complete conversion of the ferrous iron to the desired ferric titanate is obtained. Furthermore, it has been discovered that ferric titanate prepared in accordance with this invention is more uniform and homogeneous and therefore has better electrical properties relative to prior art prepared ferric titanate.

The dielectric constant of ferric titanate prepared in accordance with this invention was measured at room temperature at 50 kc. and 1 megacycle as follows:

|  | Dielectric constant | Dissipation factor |
|---|---|---|
| 50 kc | 3,500 | 1.5 |
| 1 mc | 430 | 0.61 |

In accordance with a further embodiment of this invention, the ferric titanate obtained by the foregoing procedure may be incorporated in various devitrifiable glasses, especially of the cordierite or beta-spodumene type compositions. In accordance with this feature, glasses or glass ceramics having a wide range of resistances can be obtained.

Also in accordance with this embodiment, the ferric titanate can be mixed with glasses of the $SiO_2$-$Al_2O_3$ system which additionally contain one or more of the various ingredients set forth below. It is to be noted that the glass forming ingredients set forth are for purposes of illustrating the essential components that are typically present in the glass. Thus, various other ingredients in varying amounts can be present without departing from the scope of the present invention. All percentages are based on the weight of the total composition:

| | Percent |
|---|---|
| $SiO_2$ | 0–85 |
| $Al_2O_3$ | 0–35 |
| $Li_2O$ | 0–5 |
| $Na_2O$ | 0–22 |
| MgO | 0–5 |
| $TiO_2$ | 1–12 |
| $ZrO_2$ | 0–3 |
| $P_2O_5$ | 0–2 |
| $K_2O$ | 0–3 |

The ferric titanate is mixed with the inorganic oxides in varying amounts of at least about 9 percent by weight, based on the total weight of the composition.

In a preferred embodiment hereof, the ferric titanate is added to a crystallizable glass or glass ceramic composition containing about 40 to 72 percent $SiO_2$ and 10 to 35 percent $Al_2O_3$, with other ingredients being present as indicated above.

When the ferric titanate and a glass-forming inorganic oxide are mixed in the proper proportions, a glass is formed. The exact proportions will, of course, vary within the specific composition chosen.

Glasses of the foregoing compositions containing the ferric titanate may be heat treated to produce an in situ crystallization and obtain a ceramic product consisting of a large number of randomly oriented crystals dispersed in a glassy matrix remaining as a result of the crystallization. Generally, the glasses heat treated first at a low temperture, termed the "nucleation" temperature range, to initiate nuclei formation or crystallites. Thereafter the composition is subjected to the crystallization temperature which is generally a higher temperature to complete crystallization to the desired degree. It will be understood that the optimum heat treatment schedule; viz. specific temperaures, depends on the particular glass composition as well as the final properties chosen. Therefore, it is not possible to specify a heat treatment schedule that will be optimum for all of the glasses encompassed in the foregoing table. However, it is usually preferred that the first mentioned low temperature treatment be in the region near the maximum rate of nuclei or crystallite formation where nuclei are defined as sub-microscopic precursors of the crystalline species or as a finely dispersed sub-microscopic immiscible glassy phase. It is difficult to measure directly the range of temperatures in which the relatively high rate of nuclei formation occurs or in other words, where the optimum temperature for the initial heat teatment is to be located. However, this temperature usually lies within the range of about 50° F. below the annealing point of the glass to about 250° F. above the annealing point of the glass. The temperature where a maximum or a high rate of nuclei formation occurs can be determined by empirical methods of experimentation. The heat treatment usually takes place by heating to the initial low temperature or nucleation range for at least about ½ hour, usually at least 1 hour and then heat treating at a high temperature for a sufficient length of time to effect in situ crystallization. The time of the initial heat treatment has no upper limit. Usually it is not more than 4 or 5 hours but longer times are not harmful in the least and merely increase the cost of processing.

The crystallization heat treatment stage is usually effected at higher temperature in the range of about 1800 to 2100° F. The overall heat treatment chosen, that is, the initial or nucleation heat treatment and the crystallization heat treatment results in a multitude of very small randomly oriented substantially homogeneously dispersed crystals which range in size but generally, are less than about 30 microns. It is understood, of course, that the heat treatment can be varied to produce larger crystals if desired, or if it is not necessary to obtain uniform small crystal size.

It will be apparent from the foregoing that the specific crystallizable glass chosen to which the ferric titanate is added and the heat treatment schedule do not form critical aspects of the present invention, but are merely set forth herein to show how the ferric titanate can be incorporated into compositions that are suitable for various purposes.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the feature of patentable novelty which reside in the present invention including all features which would be treated as equivalents thereof by those skilled in the art to which the invention pertains.

I claim:

1. A process for reproducibly preparing homogeneous, uniform ferric titanate crystal containing compositions of superior electrical properties which compises forming a homogeneous melt of titanium dioxide and ferric iron containing composition by heating the composition to an elevated temperature at a rapid rate sufficient to prevent substantial formation of lower valence states of iron and titanium, rapidly quenching the melt, and then controllably heat treating the quenched melt in the presence of oxygen so as to form ferric titanate crystals, the amount of titanium dioxide and ferric iron in the homogeneous melt composition being sufficient to stoichiometrically provide at least 9 percent by weight ferric titanate crystals in the heat treated, quenched melt.

2. A process for reproducibly preparing ferric titanate having the structural formula $Fe_2TiO_5$ which comprises subjecting a natural mineral compound containing ferrous iron and titanium dioxide to oxidizing conditions so as to convert substantially all of the ferrous iron to the ferric iron form, thereafter in a second step rapidly heating the natural mineral compound to an elevated temperature so as to form a homogeneous melt and thereafter quenching the melt to a glass and then reheating the glass to a closely controlled crystallizing temperature so as to form ferric titanate crystals, the amount of ferrous iron and titanium dioxide in the natural mineral compound being sufficient to provide at least 9 percent by weight ferric titanate crystals in the crystallized glass.

3. The process of claim 2 wherein the natural mineral is ilmenite.

4. The process of claim 2 wherein the first step comprises roasting the natural mineral in finely divided form.

5. The process of claim 4 wherein the natural mineral is ilmenite.

6. The process of claim 5 wherein the finely divided ilmenite has a granular size of about −400 mesh to about −40 mesh.

7. The process of claim 5 wherein the ilmenite is roasted in air at about 2400° F. for a period of about 16 to about 24 hours.

8. The process of claim 7 wherein the roasted ilmenite is rapidly heated to about 2800° F. so as to form a homogeneous melt.

9. The process of claim 8 wherein the glass is reheated to about ±5° F. of the desired crystallizing temperature.

10. A process for reproducably preparing ferric titanate having the structural formula $Fe_2TiO_5$ which comprises subjecting a natural mineral compound containing ferrous iron and titanium dioxide to oxidizing conditions so as to convert substantially all the ferrous iron to the ferric iron form, thereafter in a second step rapidly heating the natural mineral compound to an elevated temperature so as to form a homogeneous melt and thereafter quenching the melt to a glass and thereafter heat treating the glass at the crystallization temperature for the ferric titanate and mainaining the temperature within about ±5° F. of the desired crystallization temperature to thereby recrystallize ferric titanate crystals, the amount of ferrous iron and titanium dioxide in the natual mineral compound being sufficient to provide at least 9% by weight ferric titanate crystals in the crystallized glass.

References Cited
UNITED STATES PATENTS 3,393,448  7/1968  Harget et al. _____ 252—520

JAMES E. POER, Primary Examiner

U.S. Cl. X.R.

23—51; 252—519, 520